United States Patent
Koeppl et al.

(10) Patent No.: US 10,605,219 B2
(45) Date of Patent: Mar. 31, 2020

(54) PINION STARTER GEARING HAVING CORRECTED GEAR GEOMETRY

(71) Applicant: Bayerische Motoren Werke Aktiengesellschaft, Munich (DE)

(72) Inventors: Roland Koeppl, Dachau (DE); Lars Hinke, Eching (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 261 days.

(21) Appl. No.: 15/862,043

(22) Filed: Jan. 4, 2018

(65) Prior Publication Data

US 2018/0128232 A1    May 10, 2018

Related U.S. Application Data

(63) Continuation of application No. PCT/EP2016/073252, filed on Sep. 29, 2016.

(30) Foreign Application Priority Data

Oct. 8, 2015   (DE) .................. 10 2015 219 505

(51) Int. Cl.
*F16H 1/06*   (2006.01)
*F02N 11/08*   (2006.01)
(Continued)

(52) U.S. Cl.
CPC ........ *F02N 11/0851* (2013.01); *F02N 15/062* (2013.01); *F16H 1/06* (2013.01); *F16H 55/0873* (2013.01); *F16H 2055/086* (2013.01)

(58) Field of Classification Search
CPC .. F16H 1/06; F16H 55/0873; F16H 2055/086; F02N 15/062
See application file for complete search history.

(56) References Cited

U.S. PATENT DOCUMENTS

| 1,491,481 | A | * | 4/1924 | Huetter | ................. F16H 55/08 |
| | | | | | 74/401 |
| 4,932,273 | A | * | 6/1990 | Morishita | ............ F02N 15/062 |
| | | | | | 74/462 |

(Continued)

FOREIGN PATENT DOCUMENTS

| CN | 103026051 A | 4/2013 |
| CN | 103459828 A | 12/2013 |

(Continued)

OTHER PUBLICATIONS

"Fachkunde Kraftfahrzeugtechnik", Europa Lehrmittel, 2009, p. 580.

(Continued)

*Primary Examiner* — David M Fenstermacher
(74) *Attorney, Agent, or Firm* — Crowell & Moring LLP

(57) ABSTRACT

A pinion starter drive for an internal combustion engine is provided. The pinion starter drive includes a drive pinion and a starter gear. At least one tooth of the drive pinion has a drive actual profile, and at least one tooth of the starter gear has a starter actual profile. A sum of at least one discrete value of a deviation of the drive actual profile from a drive target profile in the drive pinion tooth root region and at least one discrete value of a deviation of the starter actual profile from a starter target profile in the starter gear tooth tip region is less than 0. A method of manufacture of a pinion starter drive includes selecting a drive pinion and a starter gear from a plurality of gears having a deviation sum less than zero.

11 Claims, 1 Drawing Sheet

(51) Int. Cl.
*F02N 15/06* (2006.01)
*F16H 55/08* (2006.01)

(56) References Cited

U.S. PATENT DOCUMENTS

| | | | | |
|---|---|---|---|---|
| 5,297,451 | A * | 3/1994 | Mills | F02N 15/00 74/457 |
| 5,341,699 | A * | 8/1994 | Rouverol | F16H 55/08 74/462 |
| 5,537,889 | A | 7/1996 | Shigeura et al. | |
| 5,605,518 | A * | 2/1997 | Kogure | F16H 1/28 475/344 |
| 6,205,879 | B1 * | 3/2001 | Litvin | B23F 9/025 409/10 |
| 6,276,226 | B1 * | 8/2001 | Fujiwara | F16H 55/08 74/462 |
| 7,077,026 | B2 * | 7/2006 | Colbourne | F16H 55/08 74/457 |
| 8,381,608 | B2 * | 2/2013 | Okamoto | F16H 55/0806 74/460 |
| 2002/0134184 | A1 * | 9/2002 | Hawkins | F16H 55/08 74/457 |
| 2003/0198526 | A1 * | 10/2003 | Colbourne | B23F 15/00 409/1 |
| 2008/0115610 | A1 * | 5/2008 | Cisek | F16H 55/088 74/462 |
| 2009/0049942 | A1 * | 2/2009 | Miyaoku | F16H 55/08 74/462 |
| 2009/0107275 | A1 * | 4/2009 | Cooper | F16H 55/06 74/462 |
| 2012/0204826 | A1 | 8/2012 | Schmidt | |
| 2013/0118283 | A1 | 5/2013 | Tumback | |
| 2013/0291680 | A1 | 11/2013 | Odahara et al. | |
| 2013/0291681 | A1 | 11/2013 | Kaneda et al. | |
| 2014/0298896 | A1 | 10/2014 | Casey et al. | |
| 2014/0350829 | A1 | 11/2014 | Tumback et al. | |
| 2015/0308527 | A1 | 10/2015 | Nagel et al. | |

FOREIGN PATENT DOCUMENTS

| | | |
|---|---|---|
| CN | 103459830 A | 12/2013 |
| CN | 104136763 A | 11/2014 |
| CN | 104837713 A | 8/2015 |
| DE | 694 09 765 T2 | 1/1999 |
| DE | 10 2009 028 870 A1 | 3/2011 |
| DE | 10 2010 003 361 A1 | 9/2011 |
| DE | 10 2011 078 839 A1 | 1/2013 |
| DE | 10 2012 220 065 A1 | 6/2014 |
| WO | WO 2013/098172 A1 | 7/2013 |

OTHER PUBLICATIONS

Niemann et al., "Maschinen-Elemente", 1989, pp. 49 and 50, vol. 2.
Chinese-language Office Action issued in counterpart Chinese Application No. 201680036409.6 dated May 29, 2018 with English translation (7 pages).
International Search Report (PCT/ISA/210) issued in PCT Application No. PCT/EP2016/073252 dated Feb. 15, 2017 with English translation (Four (4) pages).
German-language Written Opinion (PCT/ISA/237) issued in PCT Application No. PCT/EP2016/073252 dated Feb. 15, 2017 (Five (5) pages).
German-language Office Action issued in counterpart German Application No. 10 2015 219 505.8 dated May 2, 2016 (Four (4) pages).

* cited by examiner

PINION STARTER GEARING HAVING CORRECTED GEAR GEOMETRY

CROSS REFERENCE TO RELATED APPLICATIONS

This application is a continuation of PCT International Application No. PCT/EP2016/073252, filed Sep. 29, 2016, which claims priority under 35 U.S.C. § 119 from German Patent Application No. 10 2015 219 505.8, filed Oct. 8, 2015, the entire disclosures of which are herein expressly incorporated by reference.

BACKGROUND AND SUMMARY OF THE INVENTION

The invention relates to a pinion starter, and in particular to a pinion starter, drive a pinion starter having such a drive, and to a method for manufacturing such a pinion starter drive.

Such pinion starter drives and pinion starters are known from the prior art and are frequently referred to in motor vehicles as starters (Europa Lehrmittel, Fachkunde Kraftfahrzeugtechnik [Field of Motor Vehicle Technology], 2009; pp 580 et seq).

In motor vehicles, not only drive components are subject to regulations relating to acoustics. Since noise is often felt to be disruptive by vehicle occupants even during the starting process of the internal combustion engine, the so-called pinion starter, as is used to start the internal combustion engine in many motor vehicles, is also subject to such requirements. The invention will be described below with reference to such a pinion starter in a passenger motor vehicle, but this is not to be understood as a restriction of the invention.

In the case of a pinion starter, drive power is transmitted from an electric motor to the internal combustion engine via the pinion starter drive which is preferably embodied as a spur gear unit with two axis-parallel transmission shafts, in order to accelerate said internal combustion engine to the starting rotational speed and to transfer it into the combustion mode.

More preferably, the pinion starter drive is therefore arranged as a spur gear unit with two externally toothed spur gears which are arranged on these transmission shafts, and are designed to mesh with one another in order to transmit power. In this context, cost-effective gear wheels in which the actual toothing geometry is within a broad tolerance range with respect to a target toothing geometry are frequently used for the pinion starter drive, in particular owing to the short running times. These deviations of the toothing geometry can give rise to increased emission of sound during the operation of the pinion starter drive, that is to say during the rolling of the drive pinion on the starter gear. An object of the invention is to make available a pinion starter drive which has a simple design and reduced emission of sound.

This object is achieved by means of a pinion starter drive as claimed in patent claim 1, and a pinion starter having such a drive.

According to the invention, a pinion starter drive is to be understood as being a gear drive device which has a drive pinion and a starter gear, wherein these gear wheels are rotatably mounted on preferably axis-parallel axes and also preferably embodied as externally toothed spur gears. In this context, the spur gear can be driven by the drive pinion, at least during the starting process.

The starter gear and the drive pinion preferably have a normal modulus which is greater than 1.75 mm and preferably greater than 2 mm and particularly preferably greater than or equal to 2.1 mm and the normal modulus is also less than 3.5 mm, preferably less than 2.75 mm and particularly preferably less than or equal to 2.55 mm. The normal modulus of these gear wheels is preferably 2.11 mm or preferably 2.54 mm.

The gearwheels also preferably have an evolvent toothing system for transmitting movement. The gearwheels are preferably manufactured with a toothing quality according to DIN 3962 (08/1978) Quality Class 8 or worse, preferably 10 or worse and particularly preferably Quality Class 11 or worse, or according to the corresponding quality levels according to ISO 1328 or AGMA 2000, AGMA 2015 or BS 436. Where reference is made to DIN 3962, reference is made to DIN 3962, parts 1 to 3 in the version of August 1978.

In order to start the internal combustion engine, the drive pinion is mounted so as to be rotatable about a drive axis and the starter gear is mounted so as to be rotatable about a starter axis; these axes are preferably oriented axis-parallel with respect to one another. According to the invention, a drive reference plane is to be understood as a virtual plane which is oriented orthogonally with respect to the drive axis. At least one tooth of the drive pinion also preferably has an actual drive profile in the drive reference plane. According to the invention, the actual drive profile is understood to be the sectional line of a surface region of the drive pinion with the drive reference plane, wherein this surface region is configured to make contact with the starter gear (active tooth edge).

According to the invention, a starter reference plane is understood to be a virtual plane which is oriented orthogonally with respect to the starter axis. At least one tooth of the starter gear also preferably has an actual starter profile in the starter reference plane. According to the invention, the actual starter profile is to be understood as being the sectional line of a surface region of the starter gear with the starter reference plane, which region is configured to make contact with the drive pinion (active tooth edge).

The drive reference plane and the starter reference plane preferably coincide geometrically in a common virtual plane. In particular, the radially outer half of these actual profiles (actual drive profile, actual starter profile) are embodied as a tooth tip region, and the radially inner half as a tooth base region.

In particular, a target profile (target drive profile, target starter profile), with which the respective actual profile (actual drive profile, actual starter profile), can be compared, can be predefined in each of these reference planes (starter reference plane, drive reference plane). This target profile also preferably corresponds to an idealized toothing profile, such as would be produced in the case of idealized manufacture without any deviation and, in particular, without any profile correction. Gearwheels with an evolvent toothing are preferably used for the pinion starter drive.

Such a target (evolvent) profile can clearly be generated by a thread structure. For this purpose, a thread, at whose end there is a pen, is unwound from a (base circle) cylinder. If the thread is held tautly stretched here (so that it forms a straight line), the pin describes a circular evolvent. This means that all the points of a straight line (referred to as the generatrices) which roll on a circle describe circular evolvents (Niemann, Winter, Maschinenelemente [Machine Elements], Volume II, 1989).

In this context, according to the invention the target profile (target drive profile, target starter profile) is to be understood, in particular, as an evolvent profile of the type described above.

In reality, the tooth edges are usually generated with a tool which has or models the profile of a face toothing arrangement, in particular of a toothed rack with straight-edged, trapezoidal teeth. In this context, this tool rolls with its rolling straight lines on a manufacturing rolling circuit of the gearwheel to be generated, and this can be, in particular, the base circle (generally the pitch circle) of the gearwheel to be manufactured. The actual profile (actual drive profile, actual starter profile) is here the result of this manufacturing process and differs from the target profile (target drive profile, target starter profile) owing to unavoidable manufacturing influences.

In particular, at least the actual drive profile or the actual starter profile or both therefore deviate at least in certain sections from the respective target profile (target drive profile, target starter profile). The actual drive profile preferably deviates from the target drive profile of the drive pinion in the tooth base region, at least in certain sections, by a discrete value $F_{driveF}$, and preferably toward the interior of the tooth of the drive pinion (retracted portion of the tooth base). The actual starter profile preferably deviates from the target starter profile of the starter gear in the tooth tip region, at least in certain sections, by a discrete value $F_{starterK}$, preferably toward the interior of the tooth of the starter gear (retracted portion of the tooth tip). Both actual profiles also preferably deviate from the respective target profiles in this way. The sum of at least two discrete values of the deviations ($F_{driveF}$, $F_{starterK}$) in the tooth base region of the drive pinion, or in the tooth tip region of the starter gear ($S=F_{driveF}+F_{starterK}$) is preferably less than zero, wherein deviations of the actual profile with respect to the target profile in the direction of the interior of the tooth each have a negative sign, considered figuratively a portion where material is removed. A pinion starter drive therefore preferably has a gearwheel pair composed of the drive pinion and starter gear, with toothing arrangements with either a retracted portion of the tooth base on the drive pinion or a retracted portion of the tooth tip on the starter gear, or with both.

The values for $F_{driveF}$ and $F_{starterK}$ are also preferably each determined on the drive pinion or on the starter gear, respectively, in such a way that the points at which the deviations are determined are in contact when the gearwheels roll, that is to say are located on what is referred to as the engagement line of the toothing arrangement.

At least one of these deviations $F_{driveF}$ or $F_{starterK}$ or both are preferably selected from a range in which it is true that the deviation is preferably greater than 15 µm, preferably greater than 20 µm and particularly preferably greater than 30 µm, and the deviation is also preferably less than 80 µm, preferably less than 60 µm and particularly preferably less than, or at least essentially, 40 µm.

Such a configuration of the toothing arrangements makes it possible, in particular, to prevent early tooth engagement, and furthermore it is therefore made possible, in particular, to reduce the portion of the bracing or pushing and sliding of the transmission of movement and as a result to decrease the emission noise during the transmission of movement.

At least the actual drive profile or the actual starter profile or both preferably deviate from the target drive profile and from the target starter profile, at least in certain sections, by more than 9 µm, preferably, by more than 10 µm and particularly preferably by more than 12 µm, and also by less than 80 µm, preferably by less than 55 µm and particularly preferably by less than 30 µm and quite particularly preferably by less than 20 µm. This deviation is preferably to be understood as corresponding to the deviation $f_{H\alpha}$ according to the present specialist knowledge and, in particular, according to DIN 3962.

These gearwheels (drive pinion, starter gear) of a pinion starter drive preferably have a quality level according to DIN 3962 of 8 or worse. These quality levels are, in particular, outside the minimum accuracy level which is necessary according to specialist knowledge (Niemann, Winter, Maschinenelemente [Machine Elements], Volume II, 1989) for correction of the toothing arrangement, in particular a retracted portion of the tooth tip, retracted portion of the tooth base, so that these corrections of the toothing arrangement have a positive effect.

In one preferred embodiment, the values $F_{driveF}$ or $F_{starterK}$ or both each comprise an arithmetic mean value formation from at least 2 discrete deviations of the actual drive profile from the target drive profile, in particular in the tooth base region, or of the actual starter profile from the target starter profile, in particular in the tooth tip region. In particular, forming mean values permits better detection of the actual deviations of the respective actual profiles from the target profile.

In one preferred embodiment, the absolute value of at least one of the deviations $F_{driveF}$ is selected from a range which is greater than 2 µm, preferably greater than 3 µm, preferably greater than 4 µm and particularly preferably greater than or equal to 5 µm and also less than 60 µm, preferably less than 45 µm, preferably less than 35 µm and particularly preferably less than or equal to 25 µm. Investigations have shown that, in particular, toothing corrections on the basis of the proposed value range are particularly effective.

In one preferred embodiment of the invention, the absolute value of at least one of the deviations $F_{starterK}$ is selected from a range which is greater than 2 µm, preferably greater than 3 µm, preferably greater than 4 µm and particularly preferably greater than or equal to 5 µm and also this range is less than 60 µm, preferably less than 45 µm, preferably less than 35 µm and particularly preferably this range is less than 25 µm. Investigations have shown that, in particular, toothing corrections on the basis of the proposed value range are particularly effective.

In one preferred embodiment, the deviation $F_{driveF}$ (deviation, drive pinion, tooth base region) comprises an, in particular arithmetic, mean value from a multiplicity of discrete deviations ($F_{driveF}$) and corresponds in absolute value, at least essentially, to 20 µm. The deviation $F_{starterK}$ (deviation, starter gear tooth tip region) also preferably comprises an, in particular arithmetic, mean value from a multiplicity of discrete deviations ($F_{starterK}$) and corresponds in absolute value, at least essentially, to 20 µm.

In one preferred embodiment, a multiplicity of teeth of the drive pinion or of the starter gear or of both are configured according to at least one of the previously mentioned rules, with the result that teeth are in contact either with a retracted portion of a tooth tip or with a retracted portion of a tooth base or with both, and therefore the condition S for the sum of the deviations is met.

A pinion starter is to be understood according to the invention as being a starter device for an internal combustion engine in a motor vehicle. In this context, such a pinion starter preferably has a pinion starter drive according to the invention and an electric motor for driving the internal combustion engine via the pinion starter drive during the starting process. Furthermore, such a pinion starter has a shifting device for shifting the drive pinion, in particular in the direction of the drive axis. In this context, the shifting device is configured, in particular, in such a way that the drive pinion is mounted in such a way that it can be engaged with the starter gear, referred to as meshing of the drive pinion in the starter gear, during the starting process. The drive pinion can also preferably be disengaged by the shifting device after the starting process. Such shifting devices are known from the prior art. In particular, using a starter pinion which is configured in such a way, it is possible to reduce emission of noise during the starting process of the internal combustion engine, and therefore to increase the comfort for the motor vehicle.

A method for manufacturing a pinion starter drive makes it possible to select a pinion starter drive according to the invention from a multiplicity of drive pinions and a multiplicity of starter gears. Preferably, when there is a multiplicity of drive pinions at least one deviation $F_{driveF}$ is detected in each case. When there is a multiplicity of starter gears, in each case at least one deviation $F_{starterK}$ is also preferably detected. This detection of the deviations is preferably carried out by means of a measuring process. A gearwheel pair is preferably selected from the multiplicity of drive pinions and the multiplicity of starter gears in such a way that for the sum S of the deviation $F_{driveF}$ and the deviation $F_{starterK}$ it is true that S is less than 0. In particular, a gearwheel pair which is selected in such a way has particularly low emissions of noise during the starting process.

In particular, a pinion starter drive according to the invention can be implemented with helical gearwheels (drive pinion, starter gear) or preferably with straight-toothed gearwheels.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
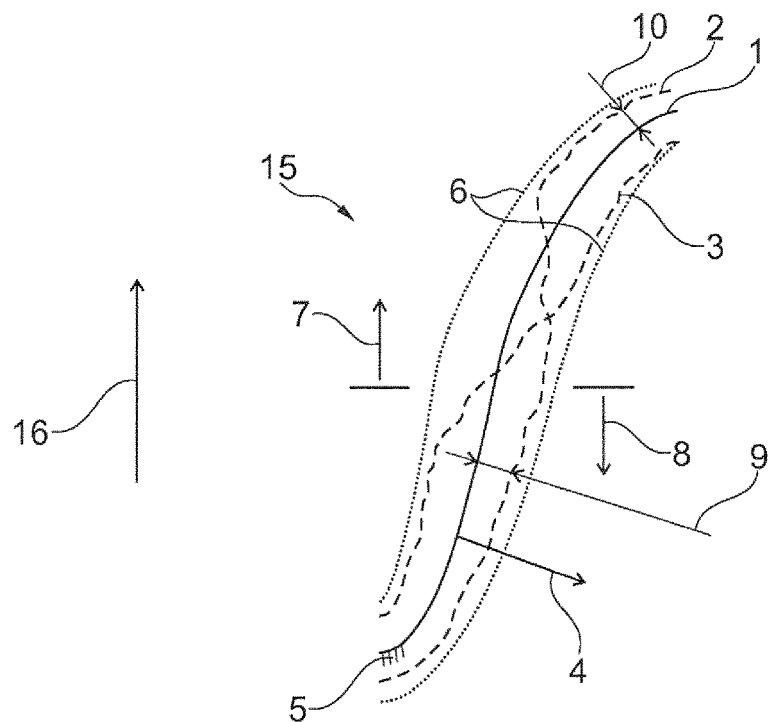
FIG. 1 illustrates target and actual profiles in accordance with an embodiment of the present invention.

FIG. 1 illustrates different target/actual profiles in a reference plane. The target drive profile 1 can clearly be generated by a thread structure. In contrast with this, a first actual drive profile 2 and a second actual drive profile 3 are illustrated.

The drive reference plane, an orthogonal plane with respect to the drive axis (not illustrated), is the plane of the illustration in which these profiles are represented. In the vertical direction 16 of the teeth, that is to say in the radially outward direction with respect to the drive axis (not illustrated) of the drive pinion, a tooth of the drive pinion, and therefore the illustrated profiles, can be divided into a tooth tip region 7 (radially outer part) and into a tooth base region 8 (radially inner part).

The tooth, illustrated here only partially by the profiles in the drive reference plane, of the drive pinion extends in the direction of the material side 5, which is shown by way of example on the target profile 1. A deviation 9 ($F_{driveF}$) of the first actual drive profile 2 in the tooth base region 8 has a negative sign in the direction 4, that is to say toward the interior of the tooth. A deviation 10 ($F_{driveK}$) of the first actual drive profile 2 in the tooth tip region 7 has a positive sign counter to the direction 4, that is to say figuratively an addition of material to the target profile.

This logic applies correspondingly to the starter gear, deviation in the tooth tip region; $F_{starterK}$, deviation in the tooth base region; $F_{starterF}$, while a deviation toward the interior of the tooth also has a negative sign here. The lines 6 which are shown indicate the tolerance range within which the actual drive profiles 2, 3 have to lie.

If the starting point is an actual starter profile (not illustrated) which does not correspond completely to the target starter profile (not illustrated), for which $F_{starterF}=F_{starterK}=0$ is therefore also true, the condition S<0 would be met with the illustrated first actual drive profile 2, and the condition would not be met with the second actual drive profile 3.

Figure 2:
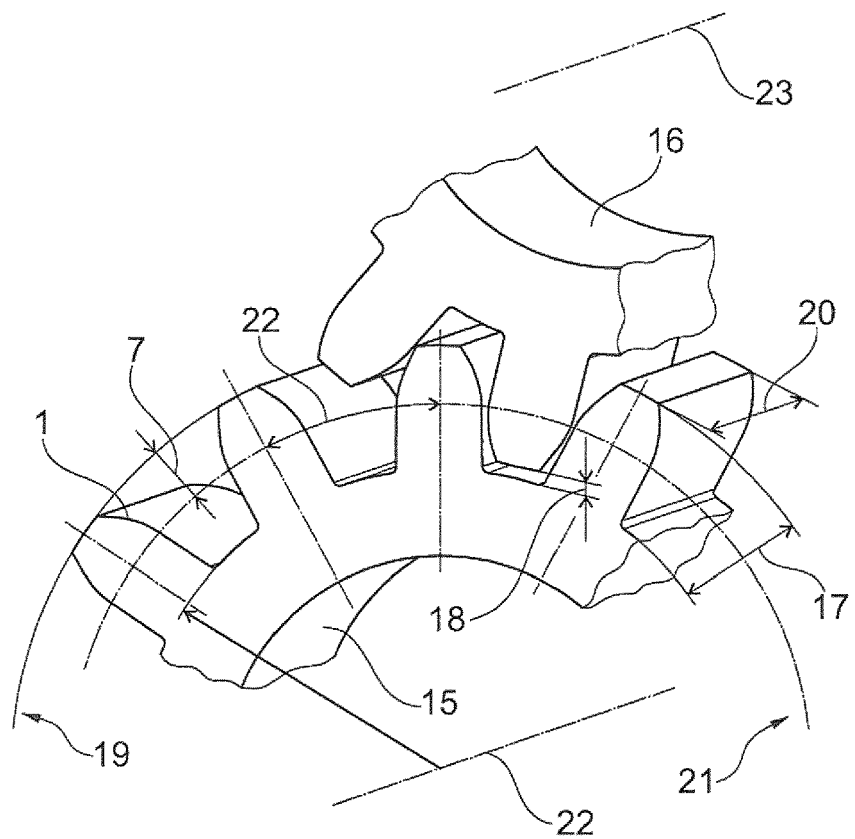
FIG. 2 illustrates a partial perspective view of a pinion starter drive in accordance with an embodiment of the present invention.

FIG. 2 illustrates a partially perspective view of a pinion starter drive with a target profile 1 of the drive pinion 15. The teeth of the drive pinion 15 have a tooth tip region 7. The drive pinion 15 meshes with the starter gear 16 in order to transmit movement. In this context, the drive pinion 15 is mounted so as to be rotatable about the drive axis 22, and the starter gear 16 is mounted so as to be rotatable about the starter axis 23.

The tooth base region, as an active part of the toothing arrangement, is obtained from the entire tooth height 17 minus the tip play 18 and the tooth tip region 7. The illustrated gearwheels 15, 16 have a tooth width 20.

The illustrated toothing arrangement has a pitch 22, and the drive pinion has a tip diameter 19 which bounds the teeth radially outward. The pitch diameter 21 has, as presented, decisive significance for the generation of the target drive profile 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A pinion starter drive for an internal combustion engine in a motor vehicle, comprising:
   a drive pinion rotatable about a drive axis; and
   a starter gear rotatable about a starter axis,
   wherein
      the drive pinion and the starter gear are gearwheels having teeth configured to mesh with one another,
      at least one tooth of the drive pinion has an actual drive profile in a drive reference plane orthogonal to the drive axis,
      at least one tooth of the starter gear has an actual starter profile in a starter reference plane oriented orthogonal to the starter axis,
      a radially outer half of the each of the actual drive profile and the actual starter profile is a tooth tip region,
      a radially inner half of the each of the actual drive profile and the actual starter profile is a tooth base region,
      a target drive profile for the at least one tooth of the drive pinion defines a drive reference plane,
      a target starter profile for the at least one tooth of the starter gear defines a starter reference plane, and a sum S of at least one discrete value of a deviation $F_{driveF}$ of the actual drive profile from the target drive profile in the tooth base region of the drive pinion and at least one discrete value of a deviation $F_{starterK}$ of the actual starter profile from the target starter profile in the tooth tip region of the starter gear is less than 0, wherein deviations in a direction toward an interior of the at least one tooth of the drive pinion and toward an interior the at least one tooth of the starter gear have a negative sign.

2. The pinion starter drive as claimed in claim 1, wherein at least one of the actual drive profile and the actual starter profile differ from the respective target drive profile and target starter profile in at least in partial sections of the respective profiles by more than 2 µm and less than 60 µm.

3. The pinion starter drive as claimed in claim 2, wherein deviation $F_{driveF}$ of the actual drive profile and the deviation $F_{starterK}$ of the actual starter profile each comprise an arithmetic mean value of at least two discrete deviations of the respective actual profiles from the respective target profiles.

4. The pinion starter drive as claimed in claim 3, wherein an absolute value of at least one of the discrete deviations $F_{driveF}$ of the actual drive profile is greater than 2 µm and less than 60 µm.

5. The pinion starter drive as claimed in claim 3, wherein an absolute value of at least one of the discrete deviations $F_{driveF}$ of the actual drive profile is greater than or equal to 5 µm and less than 25 µm.

6. The pinion starter drive as claimed in claim 5, wherein the absolute value of the arithmetic mean value of the at least two discrete deviations $F_{driveF}$ of the actual drive profile is essentially 20 µm.

7. The pinion starter drive as claimed in claim 3, wherein an absolute value of at least one of the discrete deviations $F_{starterK}$ of the actual starter profile is greater than 2 µm and less than 60 µm.

8. The pinion starter drive as claimed in claim 7, wherein an absolute value of at least one of the discrete deviations $F_{starterK}$ of the actual starter profile is greater than or equal to 5 µm and less than 25 µm.

9. The pinion starter drive as claimed in claim 8, wherein the absolute value of the arithmetic mean value of the at least two discrete deviations $F_{starterK}$ of the actual starter profile is essentially 20 µm.

10. The pinion starter having a starter pinion drive as claimed in claim 1, further comprising:
    an electric motor configured to drive the drive pinion; and
    a shifting device configured to shift the drive pinion along the drive axis to place the drive pinion into engagement with the starter gear and to disengage the drive pinion from the starter gear.

11. A method for manufacturing a pinion starter drive, comprising the acts of:
    providing a plurality of drive pinions rotatable about a drive axis and a plurality of starter gears rotatable about a starter axis, wherein
        the drive pinion and the starter gear are gearwheels having teeth configured to mesh with one another,
        at least one tooth of the drive pinion has an actual drive profile in a drive reference plane orthogonal to the drive axis,
        at least one tooth of the starter gear has an actual starter profile in a starter reference plane oriented orthogonal to the starter axis,
        a radially outer half of the each of the actual drive profile and the actual starter profile is a tooth tip region,
        a radially inner half of the each of the actual drive profile and the actual starter profile is a tooth base region,
        a target drive profile for the at least one tooth of the drive pinion defines a drive reference plane, and
        a target starter profile for the at least one tooth of the starter gear defines a starter reference plane; and
    matching one of the plurality of drive pinions and one of the plurality of starter gears to form the pinion starter drive, wherein
        a sum S of at least one discrete value of a deviation $F_{driveF}$ of the actual drive profile from the target drive profile in the tooth base region of the drive pinion and at least one discrete value of a deviation $F_{starterK}$ of the actual starter profile from the target starter profile in the tooth tip region of the starter gear is less than 0, wherein deviations in a direction toward an interior of the at least one tooth of the drive pinion and toward an interior the at least one tooth of the starter gear have a negative sign.

* * * * *